(12) United States Patent
Long et al.

(10) Patent No.: US 6,948,130 B2
(45) Date of Patent: Sep. 20, 2005

(54) APPENDING SIGNATURE TO SIZE LIMITED MESSAGE

(75) Inventors: Christopher Richard Long, Boca Raton, FL (US); Denis Yurievich Pomogaev, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 673 days.

(21) Appl. No.: 10/159,327

(22) Filed: May 31, 2002

(65) Prior Publication Data

US 2003/0222909 A1 Dec. 4, 2003

(51) Int. Cl.[7] .............................................. G09G 5/00
(52) U.S. Cl. ...................... 715/752; 715/751; 715/765; 713/170; 713/176
(58) Field of Search ............................... 715/752, 765, 715/747; 713/170, 176

(56) References Cited

U.S. PATENT DOCUMENTS

| | | | | |
|---|---|---|---|---|
| 6,574,657 B1 | * | 6/2003 | Dickinson | 709/203 |
| 6,795,919 B1 | * | 9/2004 | Gibbs et al. | 713/170 |
| 2001/0032240 A1 | * | 10/2001 | Malone et al. | 709/203 |
| 2002/0138731 A1 | * | 9/2002 | Collamore et al. | 713/176 |
| 2003/0056100 A1 | * | 3/2003 | Beatson | 713/176 |

FOREIGN PATENT DOCUMENTS

JP  410003257 A  *  1/1998  ............ G09C/1/00

OTHER PUBLICATIONS

"Silanis Introduces New E–Signature Support For The Web," Enthrust, Press Releases, Jan. 22, 2001.*

* cited by examiner

*Primary Examiner*—Tadesse Hailu
(74) *Attorney, Agent, or Firm*—Larson & Associates P.C.; Randi L. Karpinia

(57) ABSTRACT

A messaging device (100) has a keyboard, keypad or other input device (150) that receives entry of a message. A processor (110), upon receipt of a command from the keyboard (150) instructs the messaging device (100) to append a signature (which might be or have a graphical content) to the message, executes a program process (200) that determine how much unused space is available in the message (216). The program then selects (220) a signature, from a plurality of possible signatures (170, 172, 174, . . . , 176) having varying size, that will fit within the unused characters and appends (224) the selected signature to the message.

26 Claims, 5 Drawing Sheets

SELECT A SIGNATURE:
  1. BUSINESS LONG      2. BUSINESS SHORT
  3. NAME ONLY          4. FUNDRAISER
  5. EMAIL       404    6. FAMILY
  7. KIDS

FIG. 4  400

SELECT A SIGNATURE:
  1. (TOO LONG) — 506   2. BUSINESS SHORT
  3. NAME ONLY          4. FUNDRAISER
  5. EMAIL       404    6. FAMILY
  7. KIDS

FIG. 5  500

APPENDING SIGNATURE TO SIZE LIMITED MESSAGE

FIELD OF THE INVENTION

This invention relates generally to the field of size limited messaging systems such as Short Messaging Service (SMS) communication systems. More particularly, this invention relates to providing signatures for size limited messages.

BACKGROUND OF THE INVENTION

Electronic mail software and even certain two-way text paging systems provide the user with the ability to automatically append a "signature" to outgoing messages. This signature is generally a predefined segment of text that identifies the message sender (but could be any data that a user wishes to routinely append to messages). When the sender elects to send the text, or alternatively when a new message is initiated, the signature is appended at the end of the message. This saves the user from having to enter an identifying segment of information (e.g., name, address, email address, phone numbers, etc.) each time a message is created or sent. Since there is generally no practical limit to the size of messages sent on such systems, such signatures are readily accommodated without causing any problems.

Short Messaging Services such as supported by the Global System for Mobile Communications (GSM), Code Division Multiple Access (CDMA), Time Division Multiple Access (TDMA) or Universal Mobile Telecommunications System (UMTS) cellular phone standards provide a user with a suitable messaging device and an account with the ability to send short messages (e.g., messages with a size limit) to other users. Such messages may be limited in size, for example to approximately 160 characters in certain systems, or multiples of a set number of characters based on the transmission protocol including punctuation, spaces, etc. Since the messages are rather severely limited in length, automatic signatures, such as those used in popular email programs are not used since the signature may not fit in a given message. Thus the user who wishes to add a signature or graphical icon to his or her short message must do so by manually entering the signature at the end of each message.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 4 illustrates an exemplary signature menu consistent with certain embodiments of the present invention.

FIG. 5 illustrates another exemplary signature menu consistent with certain embodiments of the present invention.

DETAILED DESCRIPTION OF THE INVENTION

Figure 1:
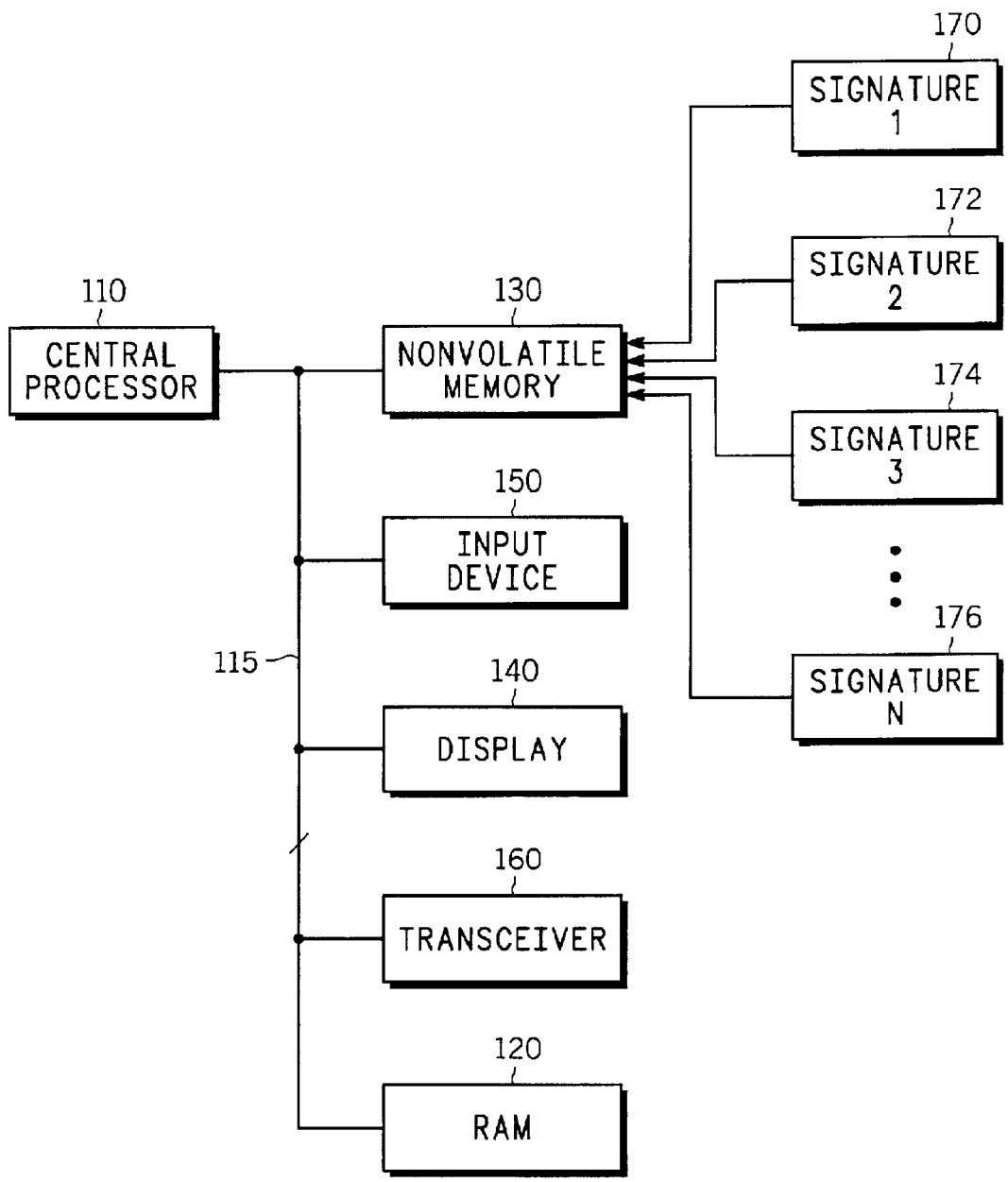
FIG. 1 is a block diagram of a messaging device consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

An exemplary messaging device 100 (which may be wired or wireless) is depicted in FIG. 1. Such a messaging device 100 may be embodied, for example without intending to limit the scope of the invention, as a cellular telephone device, a mobile telephone device, a pager device, a Personal Digital Assistant (PDA) or any other suitable device capable of transmitting messages. Such devices can send and receive messages using any suitable wired connection or wireless wideband or narrowband frequency band and modulation scheme without limitation including radio frequency bands and Infrared communication links. Wireless communications protocols including but not limited to wireless Ethernet and Bluetooth as well as any other suitable communication protocols can be used to implement the present invention without limitation. The above, however, should be considered examples without limitation, and the present invention may be implemented in a wired size limited messaging environment as well.

Messaging device 100 may have a processor 110 such as a central processor unit (CPU) (such as a microprocessor or micro-controller, for example, microprocessors such as those manufactured by Motorola, Inc. or other manufacturers) with an associated bus 115 used to connect the processor 110 to Random Access Memory (RAM) 120 and/or Non-Volatile Memory 130, in a known manner. A display at 140 is provided in order to display messages (incoming and outgoing) as well as operational menus and messages for the user. An input device such as a keyboard or keypad 150 (or any other suitable input device such as voice recognition system, card reader, etc.) is provided so the user can input information by striking keys, cursor movement or voice input, as well as make menu selections and execute control commands. Messaging device 100 also may have non-volatile storage 130 (e.g., flash memory or battery backed up RAM) for storing information including, but not limited to, program files, operating system, data files and messages. A transceiver device 160 is also coupled to the central processor to transmit and receive, for example in a wireless embodiment, radio frequency modulated messages. Analogous circuitry can be used for a wired embodiment. Such messages can be stored in the electronic storage media described above and manipulated by processor 110 or the user using input device 150.

Transceiver device 160 of the present embodiment is used to communicate within a Short Messaging Services such as supported by the GSM, CDMA, TDMA or UMTS cellular telephone standards as described above. Other services, current and future, may also be considered short messaging services or size limited messaging services within the meaning of the present invention. Such services generally provide a user with a suitable messaging device such as 100 (or the user may purchase a compatible messaging device 100) and an account with the ability to send size limited messages to other users. Such messages may be limited in size to a specified number of bytes or to a relatively short number of alpha-numeric characters, or multiples of a set number of characters based on the transmission protocol (e.g., packet size). Certain current commercial short messaging services place limits of 160 characters of text on the messages, but other message limits that could restrict a user's ability to append a single signature to all messages are considered equivalent. Generally speaking, however, such messages might generally be less than several hundred or several thousand characters to fall within the scope of the present invention.

In accordance with certain embodiments of the present invention, a user of the messaging device 100 can enter and store a plurality of signatures 170, 172, 174 through 176 of various lengths into nonvolatile memory 130 using any suitable input technique. The term "signature" as used herein, can embrace not only text but also graphical symbols and icons (any or all). Any such combination of text and graphics that a user desires to routinely append to a message can be considered a "signature" for purposes of this document without limitation to the content thereof. By way of a simple all text example, the user may enter four text signatures of varying length as follows:

| Signature 1: | John Doe |
| | The Doe Corporation |
| | 123 Doe Street |
| | Anytown, FL 99999 |
| | Phone 800-555-5555 |
| Signature 2: | John Doe |
| | The Doe Corporation |
| | Phone 800-555-5555 |
| Signature 3: | John Doe |
| | Phone 800-555-5555 |
| Signature 4: | John Doe |

Counting returns, spaces and punctuation, the above signatures range from approximately 9 characters at the shortest to about 85 characters at the longest in length. In accordance with this example, in order to apply a signature to a given short message, a messaging device 100 consistent with certain embodiments of the present invention determines, either at the time of being instructed to send the message or upon a user command to insert a signature, how many characters remain unused in the current message. Alternatively and equivalently, the determining can be done by counting the characters as they are entered and reading the count upon receipt of the user command. A signature that will fit within the remaining message space (as measured in characters or memory) is then selected and inserted into the message prior to transmission. The signature can be inserted using any number of scenarios. For example, a menu of available messages can be presented to the user (e.g., on display 140 or using an audible menu) with an indication of which will fit and the user can select from among those that will fit. In another scenario, only signatures (perhaps having associated graphical content or a signature which is embodied as a graphical icon) that will fit will be presented in the menu. In another embodiment, the largest signature (text or graphical or both) that will fit is automatically selected and inserted into the message. Any other type of information that a user wishes to routinely append to a message is to be considered equivalent to signature for purposes of this document. Many variations will occur to those skilled in the art after consideration of the present teachings.

Figure 2:
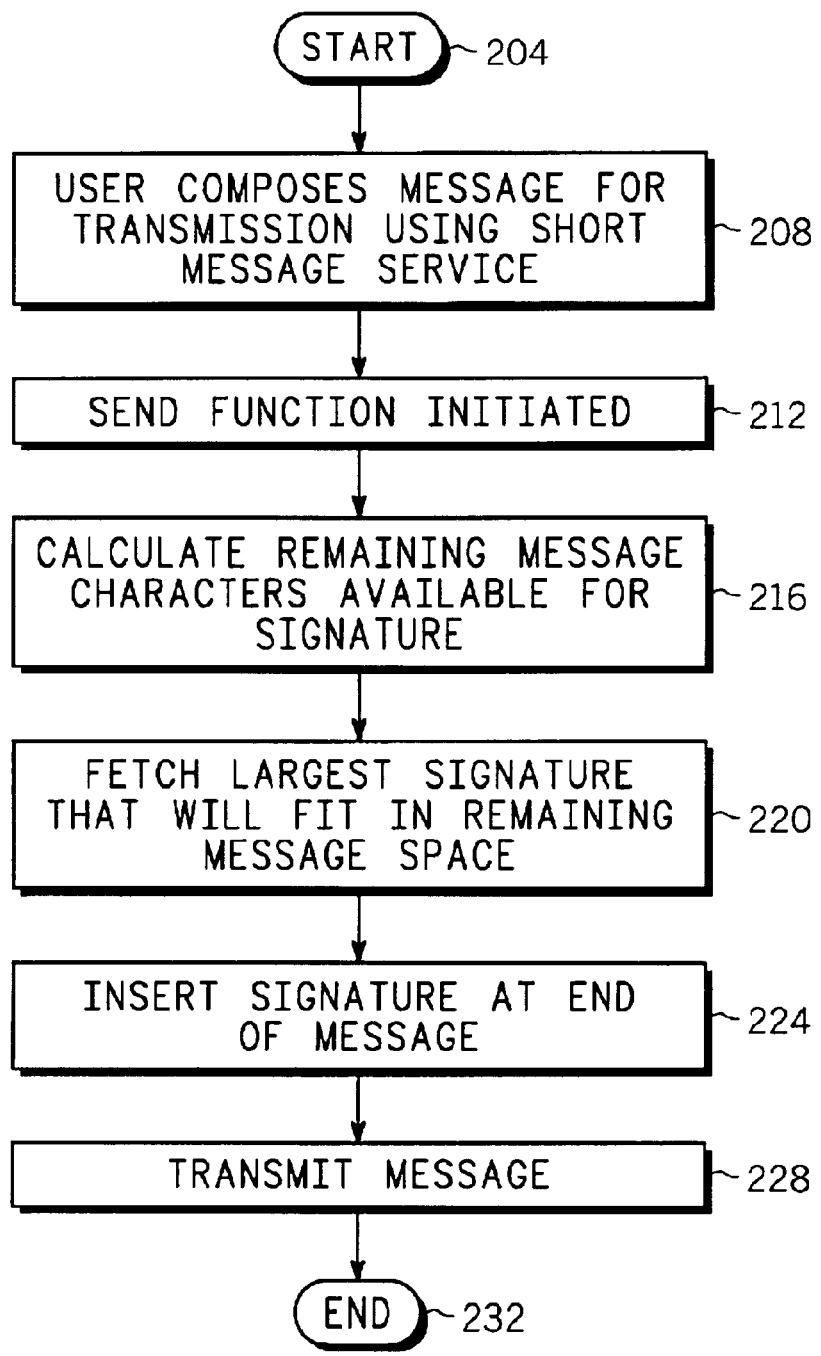
FIG. 2 is a flow chart of an automated signature process for use in a short messaging service consistent with certain embodiments of the present invention.

One exemplary embodiment consistent with certain aspects of the present invention is illustrated in FIG. 2 as process 200 starting at 204. At 208, the user composes a message to be sent to another user (the recipient) of the Short Messaging Service. Once the message is complete, the user initiates a send function at 212. At 216, the messaging device 100 computes the number of characters remaining unused in the message and at 220 fetches the largest signature that will fit in the remaining unused space in the message. At 224, the fetched signature is inserted at the end of the message and the message is transmitted at 228. The process ends at 232.

Figure 3:
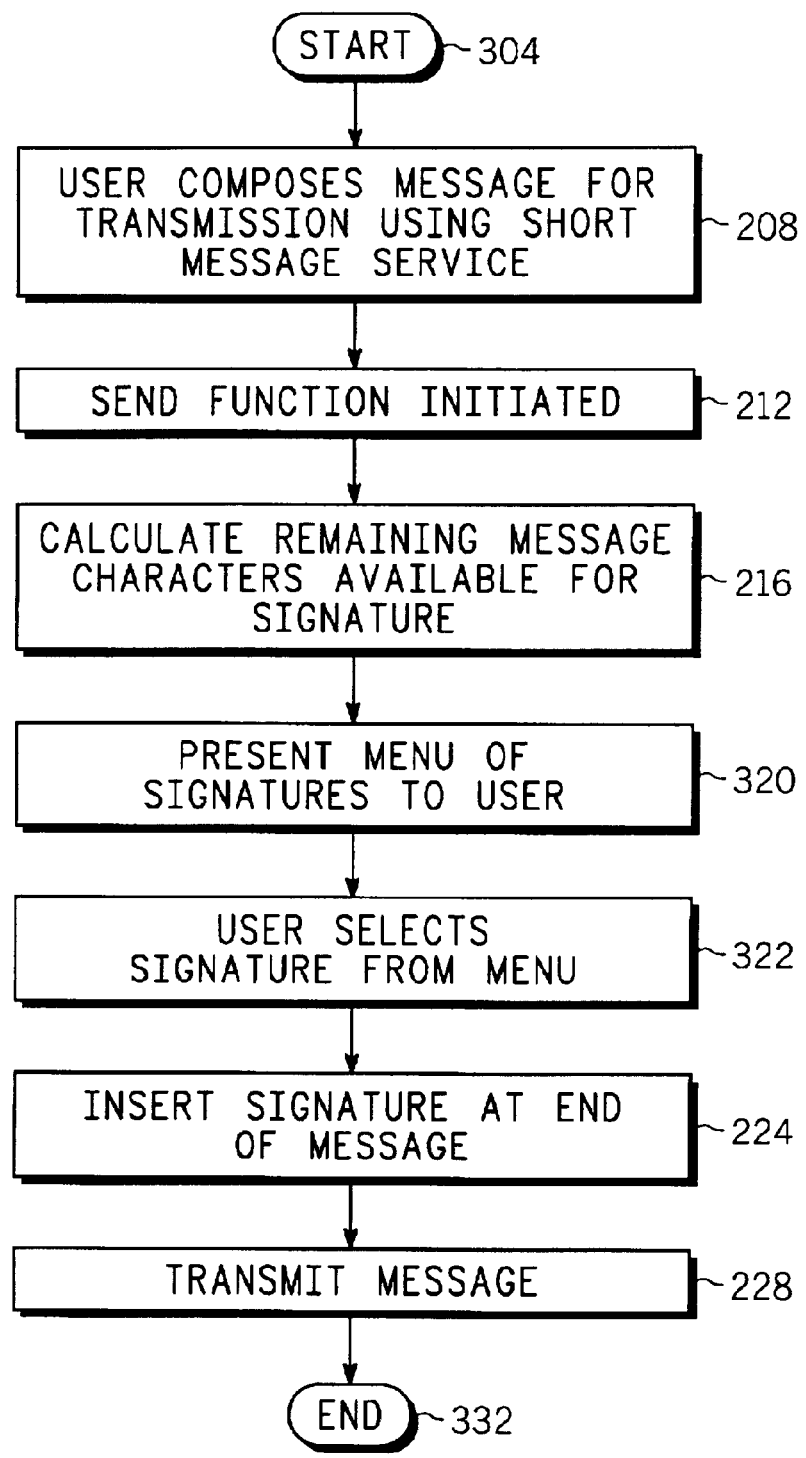
FIG. 3 is a flow chart of another automated signature process for use in a short messaging service consistent with certain other embodiments of the present invention.

An alternative embodiment is illustrated in FIG. 3 as process 300 starting at 304. At 208, the user composes a message to be sent to another user (the recipient) of the Short Messaging Service as in process 200. Once the message is complete, the user initiates a send function at 212. At 216, the messaging device 100 computes the number of characters remaining unused in the message, as in process 200 (or, reads a count of characters or memory usage). At 320 the user is presented with a menu of signatures. The menu may only have signatures small enough to fit within the remaining available characters or memory size of the message, may show all signatures with an indication of which will fit, or may simply show all available signatures. The user can then select at 322 a desired signature from the signature menu. In the event the user selects a signature that is too large, a warning may be displayed, the process may fail or other action may be taken. At 224, the fetched signature is inserted at the end of the message and the message is transmitted at 228. The process ends at 332.

Thus, without intending to limit the scope of the invention, operation of a messaging device according to a method consistent with certain embodiments of the invention can be carried out by receiving entry of a size limited message from an input device forming a part of the messaging device; receiving a command instructing the messaging device to append a signature to the size limited message; determining how much space is available in the message; selecting a signature, from a plurality of possible signatures having varying size, that will fit within the available space; and appending the selected signature to the message. A method carried out within a messaging device consistent with other embodiments automatically appends a signature to a size limited short message by receiving entry of a message from an input device forming a part of the messaging device; receiving a command instructing the messaging device to append a signature to the message; determining how much unused space is available in the message; selecting a signature, from a plurality of possible signatures, that will fit within the available space; and appending the selected signature to the message. Such operation, in certain embodiments, is carried out under the control of processor 110 executing instructions stored in volatile or nonvolatile memory.

In accordance with other embodiments consistent with the present invention, the user can create a variety of signatures based upon other criteria than simply length. By way of example, and not limitation, a plurality of signatures can be created based upon the type or purpose of the communication. Such signatures can range from very formal to very informal, friendly to intimate. Below are several examples of such signatures with varying lengths and purpose.

| Signature 1: | John Doe, Regional Manager |
| | The Doe Corporation |
| | 123 Doe Street |

-continued

| | |
|---|---|
| | Anytown, FL 99999 |
| | Phone 800-555-5555 |
| Signature 2: | John Doe, 800-555-5555 |
| Signature 3: | John Doe |
| Signature 4: | John Doe |
| | Chairman, Fundraising Committee |
| Signature 5: | John Doe |
| | email jdoe@johndoecorp.com |
| Signature 6: | Love, John |
| Signature 7: | Dad |

These various signatures range from formal signatures to personal signatures and are in some instances tailored to the recipient and to the type of further communication that might be expected (email, phone call, mail, etc.). In an alternative embodiment, the user may select a signature based not only upon the size of the signature and amount of space left, but also based upon other criteria. In this embodiment, the process flows similar to that shown in FIG. 3, but since other criteria are used, the user would select from a menu such as menu 400 illustrated in FIG. 4. In this illustrative menu (e.g., called at 320 of process 300), each of the seven signatures shown above is assigned a descriptive name or icon at the time the signatures are saved. A signature can then be selected by navigating a highlighted cursor 404 (e.g., using reverse video or other techniques to indicate the selection) to the desired signature using the messaging device's cursor control and then entering the desired signature using a selection control (e.g., an enter key), or by directly entering the signature number. While this menu shows names, the menu might equally well use icons to represent each menu selection. Navigation can be prohibited to signatures that are too long, or those menu selections that are too long can be omitted, for example as in menu 500 of FIG. 5 where the first signature 506 is omitted and replaced with an indication that the signature is too long to fit in the remaining unused characters of the size limited short message. The exemplary menu shown assumes five lines of text are available on the messaging device 100's display 140. Scrolling and other techniques can be used if the menu is greater in size than can be displayed on the display. Other variations will occur to those skilled in the art after consideration of these teachings.

In yet another embodiment consistent with aspects of the present invention, signatures can be associated with a category assigned to an address in an address manager database residing on the messaging device 100. In this embodiment, the longest signature in a given category can be used subject to the remaining unused characters in the message. Thus, in one example, the address book may have entries that appear as follows (or similar):

| First Name | Last Name | Category | Phone Number | ... |
|---|---|---|---|---|
| Bill | Doe | Family | 555-1111 | ... |
| Sue | Doe | Family | 555-1112 | ... |
| Vanessa | Doe | Family | 555-1111 | ... |
| George | Harris | Work | 555-4444 | ... |
| Bill | Jones | Home | 555-3333 | ... |
| Fred | Lynch | Work | 555-2222 | ... |
| ... | ... | ... | ... | ... |

In this embodiment, the signature used is selected based upon a category in the address book. By way of example, and not limitation, as illustrated above, three categories might be used—Home, Work and Family. In other scenarios, other categories might be used or even created by the user. In addition to the categories being associated with contacts in the address book, they are also associated with the plurality of signatures of varying length. Thus, several signatures per category can be generated as, for example, the following:

| | |
|---|---|
| Work Signature 1: | John Doe, Regional Manager |
| | The Doe Corporation |
| | 123 Doe Street |
| | Anytown, FL 99999 |
| | Phone 800-555-5555 |
| Work Signature 2: | John Doe, 800-555-5555 |
| | The Doe Corp. |
| Work Signature 3: | John Doe, 800-555-5555 |
| Home Signature 1: | John Doe, 555-1111 |
| | Email john@homeemailaddress.com |
| Home Signature 2: | John Doe |
| Family Signature 1: | Love, John Doe |
| Family Signature 2: | John D. |

Figure 6:
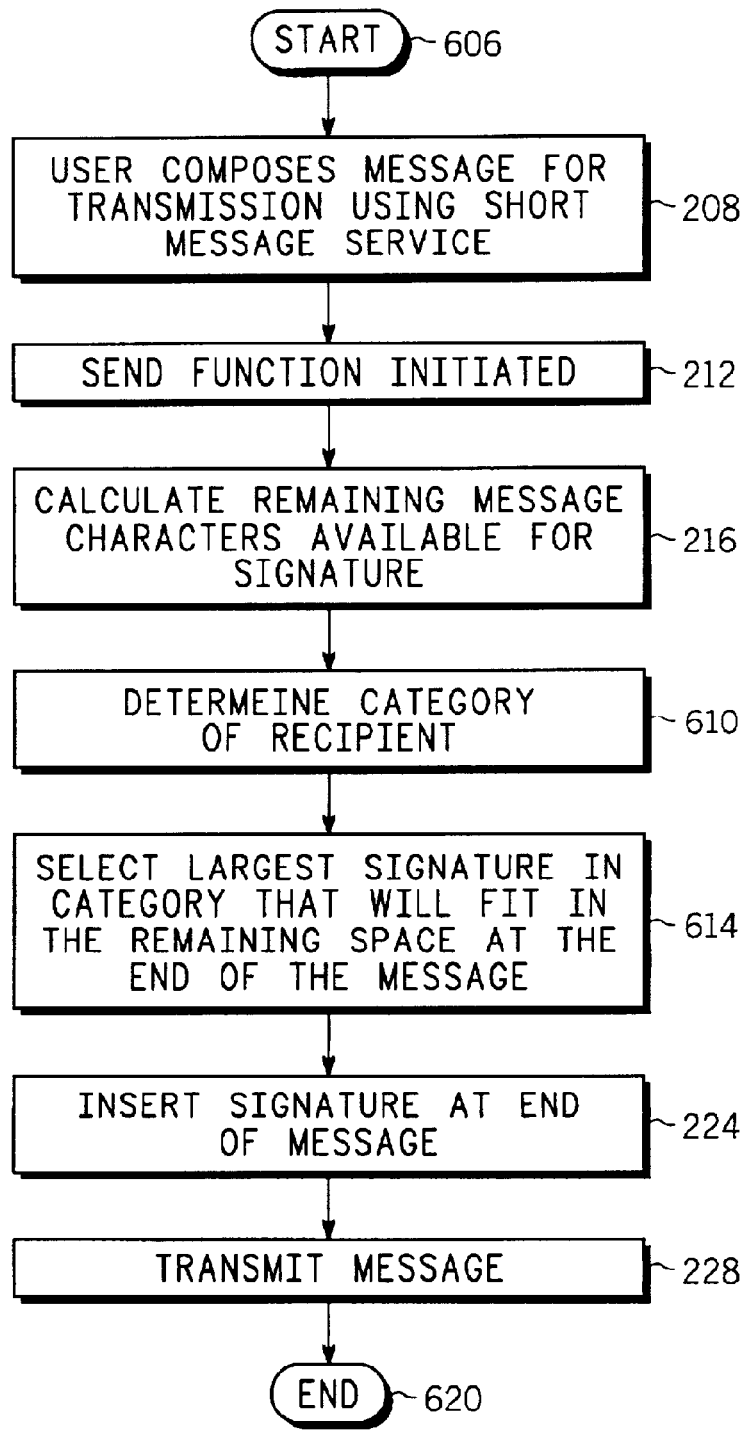
FIG. 6 is a flow chart of another automated signature process for use in a short messaging service consistent with certain embodiments of the present invention.

An exemplary process for selection of a signature based upon the address book's category is illustrated as process 600 of FIG. 6 starting at 606. At 208, the user composes a message to be sent to another user of the Short Messaging Service as in process 200. Once the message is complete, the user initiates a send function at 212 (or alternatively, initiates a signature function followed by a send function). At 216, the messaging device computes the number of characters remaining unused in the message, as in process 200 (or alternatively, reads the number of characters remaining from a counter that counts the characters as they are entered). At 610, the process determines which category the recipient is in (in the above example, home, work or family). The process then selects the largest signature in the category of the recipient that will fit within the space remaining at the end of the message. At 224, the selected signature is inserted at the end of the message and the message is transmitted at 228. The process ends at 620.

Thus, in this example, if a message is to be sent to George Harris, the category is "work" so a signature at 614 would be selected to be the largest that would fit in the remaining space at the end of the message. If plenty of room is available, the longest signature (work signature #1) would be selected. If less room is available, work signature #2 might be selected. If minimal room is available, work signature #3 is selected. Since short messaging services generally charge by the message without regard for the content of the message, use of the present invention permits the user to provide a recipient with a maximal amount of data in each message for no additional cost.

In the illustrations above, the automated signature functions have been described as a function that is initiated by execution of a "send" function to transmit a message. However, this should not be limiting since the automated signature function could equally well be initiated by a dedicated signature key, menu selection or other mechanism, without limitation. Other variations will occur to those skilled in the art upon consideration of the teachings herein.

Those skilled in the art will recognize that the present invention has been described in terms of exemplary embodiments based upon use of a programmed processor 110 carrying out the operations described within a messaging device 100 that sends and receives messages of limited length (i.e., size limited messages). However, the invention should not be so limited, since the present invention could be implemented using non-wireless devices and hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using any suitable electronic storage medium such as for example disc storage devices, Read Only Memory (ROM) devices, Random Access Memory (RAM) devices; optical storage elements, magnetic storage elements, magneto-optical storage elements, flash memory and/or other equivalent storage technologies without departing from the present invention. Such alternative storage devices should be considered equivalents.

The present invention, as described in embodiments herein, is implemented using a programmed processor 110 executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

The described invention can also be implemented on a variety of mediums and protocols that currently exist such as GSM, CDMA, TDMA, and UMTS as well as can be naturally applied to future protocols and devices that support messages of a fixed and finite length.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method carried out within a messaging device, of automatically appending a signature to a size limited message, comprising:
   receiving entry of a message from an input device forming a part of the messaging device;
   receiving a command instructing the messaging device to append a signature to the message;
   determining how much unused space is available in the message;
   selecting a signature, from a plurality of possible signatures, that will fit within the available space; and
   appending the selected signature to the message.

2. The method according to claim 1, wherein the selecting comprises selecting a signature, from the plurality of possible signatures, having the greatest size that will fit within the available space.

3. The method according to claim 2, wherein the plurality of possible signatures is associated with a category assigned to a recipient of the message.

4. The method according to claim 3, wherein the plurality of possible signatures and the recipients are assigned one of multiple categories assigned by a user.

5. The method according to claim 3, wherein the category of the recipient is retrieved from an address book database residing within the messaging device.

6. The method according to claim 1, wherein the selecting comprises:
   presenting a menu of possible signatures to a user; and
   receiving an input from the user via the input device selecting one of the possible signatures that will fit within the available space.

7. The method according to claim 6, wherein the presenting comprises displaying the menu on a visual display.

8. The method according to claim 1, wherein the command instructing the messaging device to append a signature to the message comprises command to send the message.

9. The method according to claim 1, wherein the plurality of possible signatures is associated with a category assigned to a recipient of the message.

10. The method according to claim 9, wherein the plurality of possible signatures and the recipients are assigned one of the multiple categories defined by a user.

11. The method according to claim 9, wherein the category of the recipient is retrieved from an address book database residing within the messaging device.

12. The method according to claim 1, wherein at least one of the plurality of possible signatures comprises graphical data.

13. Within a messaging device that automatically appends a signature to a size limited message, an electronic storage medium that carries instructions for execution on a processor that:
   receive entry of the message from an input device forming a part of the messaging device;
   receive a command instructing the messaging device to append a signature to the message;
   determine how much space is available in the message;
   select a signature, from a plurality of possible signatures having varying size, that will fit within the available space; and
   append the selected signature to the message.

14. The electronic storage medium according to claim 13, wherein the selecting comprises selecting a largest of the plurality of possible signatures that will fit within the available space.

15. The electronic storage medium according to claim 13, wherein the selecting comprises:
   presenting a menu of possible signatures to a user; and
   receiving an input from the user via the input device selecting one of the possible signatures that will fit within the available space.

16. A messaging device that automatically appends a signature to a size limited message, comprising:
   an input circuit that receives entry of a message;
   a processor that, upon receipt of a command from the input circuit instructing the messaging device to append a signature to the message executes a program to:
   determine how much space is available in the message;
   select a signature, from a plurality of possible signatures having varying size, that will fit within the available space; and
   append the selected signature to the message.

17. The messaging device according to claim 16, wherein the selecting of a signature is carried out in the program by selecting a largest signature that will fit in the available space from the plurality of possible signatures.

18. The messaging device according to claim 17, wherein the selecting of a signature is carried out in the program by:
   presenting a menu of possible signatures to a user; and
   receiving an input from the user via the input device selecting one of the possible signatures that will fit within the available space.

19. The messaging device according to claim 18, further comprising a visual display, and wherein the presenting comprises displaying the menu on a visual display.

20. The messaging device according to claim 17, wherein the plurality of possible signatures is associated with a category assigned to a recipient of the message.

21. The messaging device according to claim 20, further comprising an address book database; and
   wherein, the category of the recipient is retrieved from the address book database.

22. The messaging device according to claim 16, wherein the command instructing the messaging device to append a signature to the message comprises command to send the message.

23. The messaging device according to claim 16, wherein the plurality of possible signatures is associated with a category assigned to a recipient of the message.

24. The messaging device according to claim 23, wherein the plurality of possible signatures and the recipients are assigned to one of a plurality of categories.

25. The messaging device according to claim 23, further comprising an address book database; and
   wherein, the category of the recipient is retrieved from the address book database.

26. The messaging device according to claim 16, wherein at least one of the plurality of possible signatures comprises graphical data.

* * * * *